United States Patent
Brotz

(10) Patent No.: US 6,695,299 B1
(45) Date of Patent: Feb. 24, 2004

(54) DISPOSABLE CUTTING BOARD

(76) Inventor: Gregory R. Brotz, P.O. Box 1322, Sheboygan, WI (US) 53081

( * ) Notice: Subject to any disclaimer, the term of this patent is extended or adjusted under 35 U.S.C. 154(b) by 0 days.

(21) Appl. No.: 10/298,289

(22) Filed: Nov. 18, 2002

(51) Int. Cl.[7] .................................................. B25B 11/00
(52) U.S. Cl. .............................. 269/289 R; 269/302.1
(58) Field of Search .................... 269/302.1, 289 R, 269/13; 312/246, 244, 319

(56) References Cited

U.S. PATENT DOCUMENTS

| | | | | |
|---|---|---|---|---|
| 1,151,895 A | * | 8/1915 | Mix | 269/302.1 |
| 1,212,040 A | * | 1/1917 | Fletcher | 269/302.1 |
| 5,626,067 A | * | 5/1997 | Lothe | 269/302.1 |
| 5,984,294 A | * | 11/1999 | Bogomolny | 269/302.1 |
| 6,422,551 B1 | * | 7/2002 | Brotz | 269/289 R |

* cited by examiner

*Primary Examiner*—Lee D. Wilson
(74) *Attorney, Agent, or Firm*—William Nitkin

(57) ABSTRACT

An inexpensive disposable cutting board is disclosed having a tough plastic upper sheet on a lower base. In one embodiment the lower surface of the base has a tough plastic lower sheet thereon, making the cutting board reversible for two uses. The reversible cutting board can include a manually removable, lightly adhered cover sheet to protect the lower sheet from contamination when it is face down on a surface when the upper surface of the cutting board is being used.

2 Claims, 1 Drawing Sheet

DISPOSABLE CUTTING BOARD

BACKGROUND OF THE INVENTION

1. Field of the Invention

The device of this invention resides in the field of disposable cutting boards and more particularly relates to a cutting board having a toughened plastic upper sheet adhered to a lower base. In one embodiment the cutting board can be reversible and have plastic sheets adhered on each side of the base.

2. History of the Prior Art

Cutting boards are well known in the prior art and have significant problems with the build up of bacteria thereon, especially when the cutting boards have been cut by knives. Such cuts made in cutting boards harbor bacteria. It is difficult to thoroughly clean cutting boards whether made of wood or plastic. Due to their cost and apparent sturdiness, cutting boards of the prior art are seldom thrown away or replaced.

SUMMARY OF THE INVENTION

It is an object of this invention to provide a new cutting board which is disposable. The advantage of a disposable cutting board is that bacteria buildup on the cutting board is limited as the cutting board is thrown away after one or limited time-usage. The structure of this invention is a cutting board of typical dimensions with an upper surface of a toughened plastic sheet, such as a polypropylene sheet which is flat and which is adhered to a papier-mâché base by an adhesive. The base can be a papier-mâché product including cardboard or a foamed plastic such as foamed polystyrene, polyurethane, polyacrylic, phenolic or equivalent. The use of a phenolic foam has the advantage in that it is germicidal in nature and would extend the cutting board's life by suppressing bacterial growth. Even when a phenolic foam board is disposed of, it will continue to be bactericidal and lessen odors in the trash and/or landfill. When the cutting board's cover sheet has been cut through or the board has had much use, the cutting board should be disposed of before there is a significant bacterial buildup. The cutting board of this invention can be molded in one embodiment with a trough around its perimeter for the collection of fluids. The cutting boards can be provided in a stacked pile which can be easily packaged for sale.

DESCRIPTION OF THE PREFERRED EMBODIMENT(S)

Figure 1:
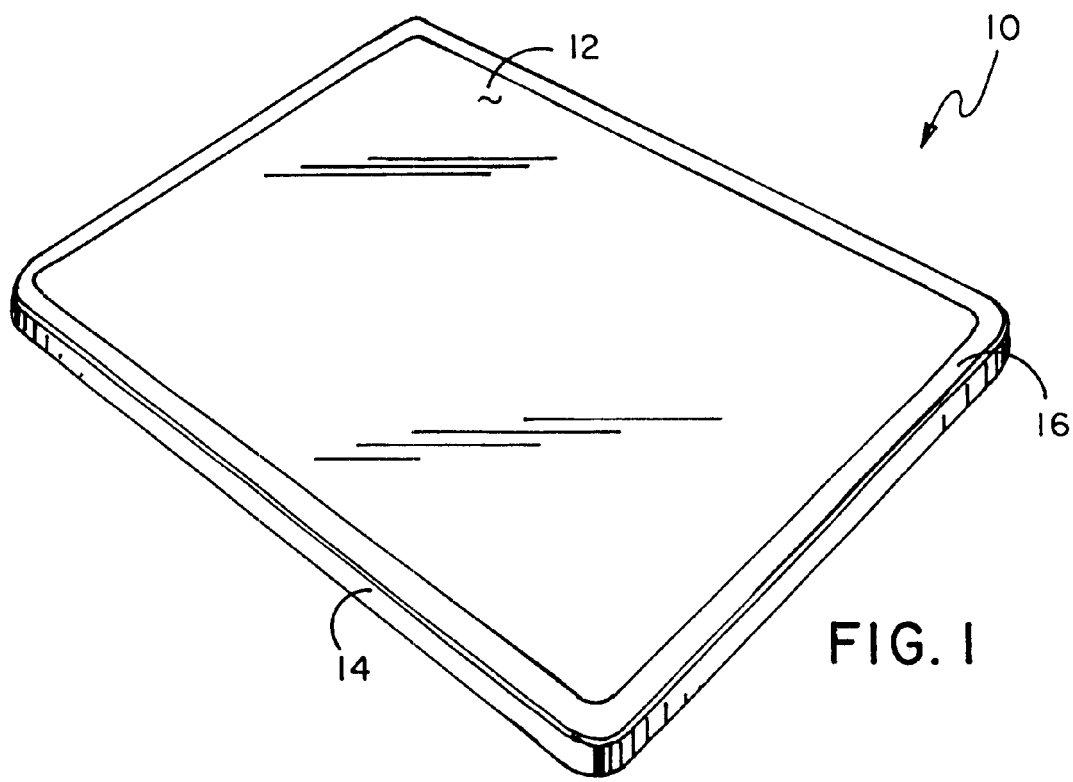
FIG. 1 illustrates a perspective view of the disposable cutting board of this invention with upper surface plastic sheet disposed above the papier-mâché base.

FIG. 1 illustrates the structure of disposable cutting board 10 of this invention which consists of a thin laminate cover sheet 12 of flexible, high-tensile strength plastic film which can be formed of polypropylene or equivalent tough liquid-impermeable material having a thickness approximately in the range of 3–6 mils which is adhered to a base 14 of rigid papier-mâché material or foamed plastic by an adhesive. The base can have a thickness of 30–100 thousandths of an inch. A trough 16 can be molded around the perimeter of the cutting board. It should be noted that when the term "papier-mâché" is used to describe the base, it encompasses cardboard, bound macerated or reconstituted wood and other equivalent materials. A corrugated or honeycomb cardboard base can also be used. The thin, high-tensile strength film sheet gives the cutting board added strength and rigidity since it helps the base resist flexure as it might be used to carry food from one place to another.

Figure 2:
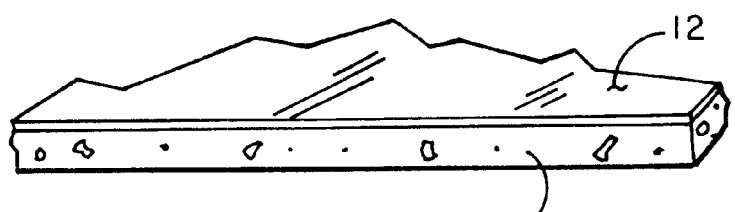
FIG. 2 illustrates a perspective view of a section of the cutting board of this invention.

FIG. 2 illustrates sheet 12 adhered to the top of base 14. The user should dispose of the low-cost cutting board before there is any significant build up of bacteria thereon. Sheet 12 can be cleaned by rinsing and wiping clean and if base 14 is composed of foamed plastic, it can be washed in traditional dishwashers or by immersion in water. If base 14 is of papier-mâché type material, it would degrade and weaken when wet and could not be washed in traditional dishwashers or by immersion in water. The use of the limited-life, disposable cutting board of this invention is desirable to avoid bacterial buildup and possible food contamination.

Figure 3:
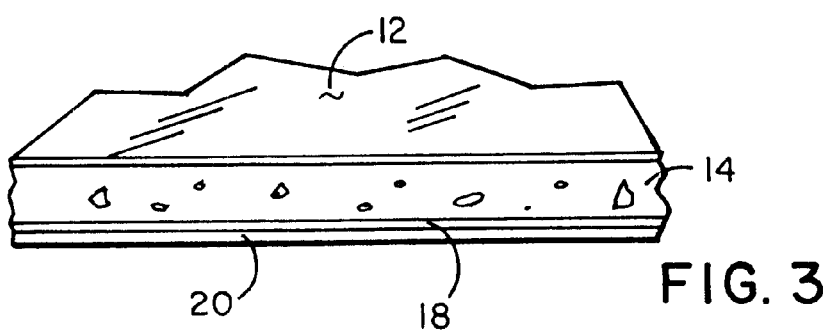
FIG. 3 illustrates a sectional perspective view of the reversible cutting board of this invention with plastic sheets adhered on both sides of the base and with a removable sheet covering the lower plastic sheet which cutting board can be used on both sides before disposal.

In one embodiment of this invention a reversible cutting board is provided, as seen in FIG. 3. Base 14 of the cutting board can have an upper sheet 12 and a lower sheet 18 adhered thereto which allows one side to be used first and the second side for later use. The use of a high-tensile strength film on both sides adds further rigidity to the board. A removable cover sheet 20 can be removably adhered to lower sheet 18 to prevent lower sheet 18 from becoming dirty when it is face down on a surface while upper sheet 12 is being used. When board 10 is to be used with its lower sheet 18 facing upwards, cover sheet 20, which can be a wax paper or equivalent and which is lightly attached to lower sheet 18, is manually peeled off, exposing a clean lower sheet to be used as the upper surface of the cutting board, when desired. In some embodiments cover sheet 20 can be re-adhered on used upper sheet 12 when board 10 is inverted so that used upper sheet 12, when placed face down on a surface will not get that surface contaminated or dirty. Cover sheet 20 can be held thereon by many methods for removable attachment, such as by being lightly attached by moisture surface tension or by tacky means, such as sticky silicon gel thereon or equivalent.

In some embodiments it may be desirable to that the lower surface of the cutting board not be a good cutting surface to promote the board's disposal after only the top has been used. A good cutting surface must be lubricious so as to promote the sliding action of the knife thereagainst. Metal is generally a poor cutting surface so that in this further embodiment a metal foil, such as tin foil, aluminum foil or equivalent can be adhered to the base on its lower surface.

Although the present invention has been described with reference to particular embodiments, it will be apparent to those skilled in the art that variations and modifications can be substituted therefore without departing from the principles and spirit of the invention.

I claim:

1. A disposable cutting board comprising:
   an upper thin flat tough plastic sheet,
   a base having a perimeter, a top and a bottom, said base disposed beneath said upper sheet with said top adhered to said upper sheet:
   a lower thin tough plastic sheet adhered to the bottom of said base; and a removable cover sheet lightly adhered to said lower sheet.

2. The cutting board of claim 1 wherein said cover sheet, when removed from said lower sheet, can be adhered to said used upper sheet to protect the surface on which said board is placed from any contaminants accumulated on said used upper sheet.

* * * * *